July 5, 1960  R. S. ROTE  2,943,388
METHOD OF MAKING CORROSION RESISTANT CLAD STEEL PLATE
Filed July 8, 1957  3 Sheets-Sheet 1
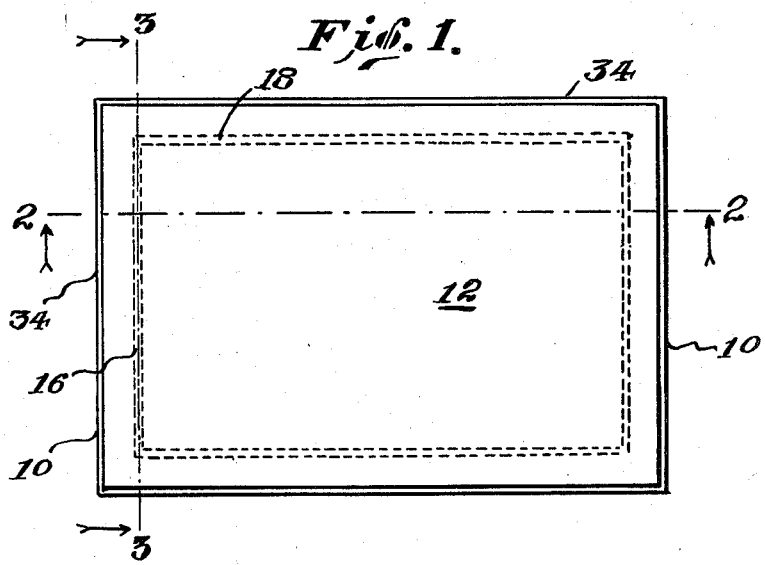
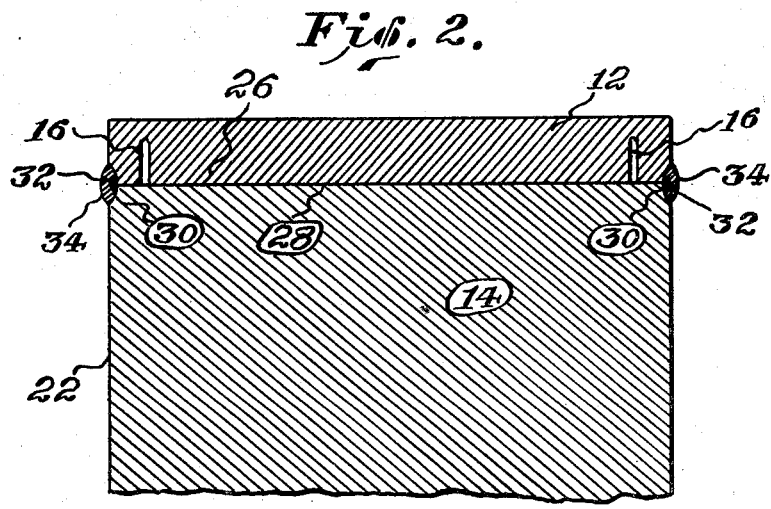
INVENTOR.
Richard S. Rote.

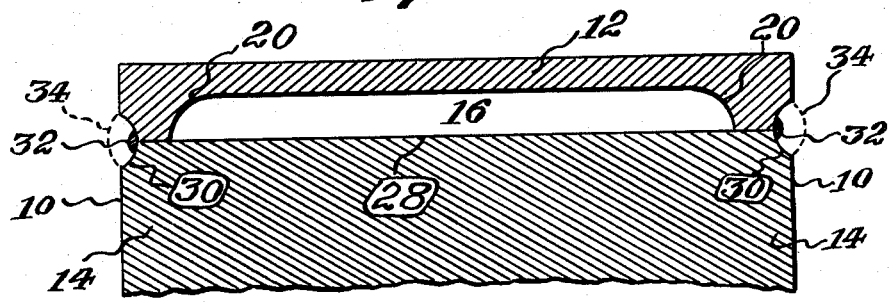
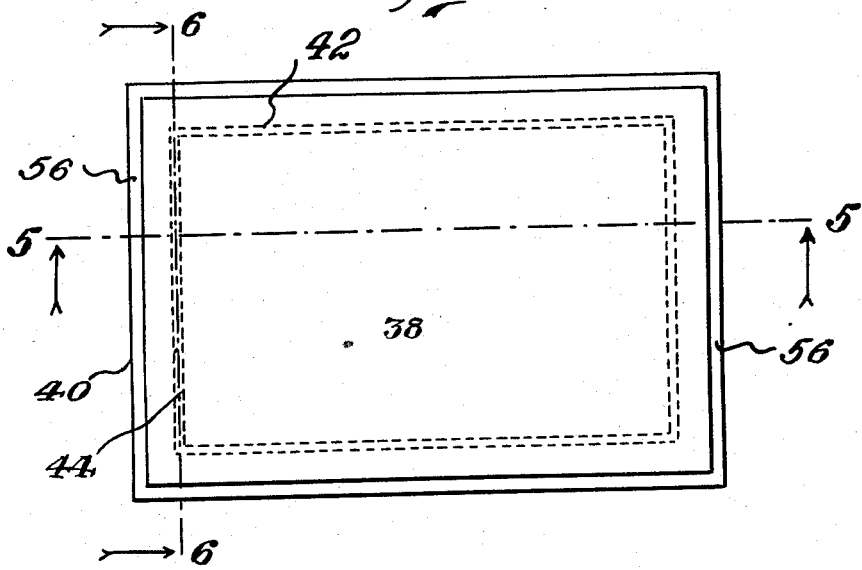

July 5, 1960 R. S. ROTE 2,943,388
METHOD OF MAKING CORROSION RESISTANT CLAD STEEL PLATE
Filed July 8, 1957 3 Sheets-Sheet 3

INVENTOR.
Richard S. Rote.
BY
Attorney.

United States Patent Office 2,943,388
Patented July 5, 1960

2,943,388
METHOD OF MAKING CORROSION RESISTANT CLAD STEEL PLATE

Richard S. Rote, Coatesville, Pa., assignor to Lukens Steel Company, Coatesville, Pa., a corporation of Pennsylvania Filed July 8, 1957, Ser. No. 670,451

1 Claim. (Cl. 29—471.5)

This invention relates to a novel method of making composite steel, and to a composite steel article, preferably producing a two-ply article, although an article having more than two plies is included as hereinafter set forth.

An object of the invention is to provide greater yields from clad plates due to the larger number of plates of different sizes capable of production by the instant process.

A further object is to produce clad plate by a method which reduces the amount of end scrap resulting from trimming the sides of clad plates.

Another object is to produce a clad plate that requires less machining time in the machining operation.

Still another object is to reduce the amount of rolling since the clad plate comes to the rolling mill in an "unbowed" condition.

Yet another object is to provide for free movement of the cladding plate during heating and rolling of the same, thus minimizing the severe thermal stresses which cause the welds to fail. These welds are used to fix the cladding and backing plates in proper position and to prevent the entrance of air or gases between the abutting faces of the plates, during the several operations of heating, and rolling to proper gauge.

An additional object is to prevent weld failure during heating and rolling.

Other objects will appear hereinafter throughout the specification.

In the drawings:

Figure 1 is a top plan view of one form of a clad steel plate of the present method, and showing the grooves in dotted lines;

Figure 2 is a vertical section taken on the line 2—2 of Figure 1;

Figure 3 is a vertical section taken on the line 3—3 of Figure 1;

Figure 4 is a top plan view of a second form of the invention;

Figure 5:
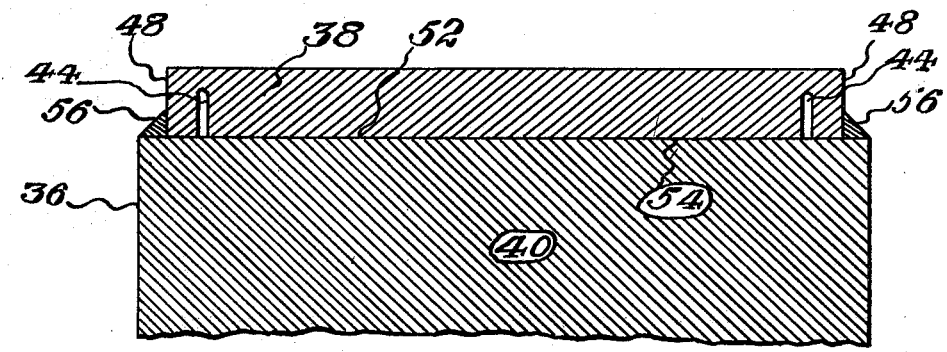
Figure 5 is a vertical section taken on line 5—5 of Figure 4.

Referring to the form shown in Figures 1 to 3, the clad plate is indicated as a whole by the numeral 10. The plate consists of a cladding plate of stainless steel, nickel, Monel metal or other metal or their alloys indicated by the numeral 12. The backing steel plate such as a plate of carbon steel is indicated by the numeral 14.

In Figures 1–3, the cladding plate and base plate are of the same size. Prior to uniting the cladding plate and base plate, the cladding plate is provided with longitudinal grooves 18 and transverse grooves 16, shown in dotted lines in Figure 1.

An especial feature of this invention is the provision of grooves which do not extend to the side edges of the cladding plate. Preferably these grooves are produced by milling cutters and the milling operation is discontinued before reaching the side edges of the cladding plate. The ends of the grooves will be curved so as to have the same curvature of those of the peripheries of the particular milling cutter used.

As shown in these figures the side faces of the cladding plate and base plate are continuations of each other, the cladding plate and base plate being of the same overall width and length, i.e., of the same size except that the thickness of the cladding plate is less than that of the base plate, the difference in thickness depending to some extent at least on the material of the cladding plate, the ultimate use of the composite plate, and other factors.

The grooves 16 and 18 start by milling the bonding surface 26 of the cladding plate. This bonding surface is welded to the bonding surface of the base plate 28 by heat and pressure as hereinafter described. These grooves are milled or otherwise formed so as to extend to a minimum of one half the thickness of the cladding plate.

The depth of the grooves 16 and 18 will depend to a certain extent, however, as determined by experiment, and each will vary in accordance with the material of the insert, its thickness and overall dimensions. Generally, the greater the coefficient of expansion of the cladding plate and the thicker the cladding plate, the larger the size of the grooves, both as to the width and the depth of the grooves. Additionally, the amount of heating, i.e., the higher the temperature and the greater reduction to plate gauge requirements, the wider and deeper the grooves will be milled in the cladding plate. As shown in Figures 1 to 3 a side groove 30 has been formed in the cladding plate and base plate for the deposit of a sealing material such as weld metal.

After the grooves 16 and 18 are formed in the cladding plate, and the faces 26 and 28 are cleaned and otherwise prepared for joining the cladding plate to the base plate by welding the said faces to each other, assuming further that the side groove 30 has been formed, as by grinding, the cladding plate and base plate are assembled. They are then tack welded as shown at 32, after which they are seal-welded as indicated at 34. The methods of laying the welds 32 and 34 may include manual, submerged arc, or consumable electrode inert gas shielded arc including the use of $CO_2$ gas. The entire periphery of the side edges is welded so as to seal the meeting faces 26, 28.

The assembly is preferably heated in a pit with the cladding down to standard rolling temperatures, held until uniform, and then removed from the pit and rolled to gauge.

The only variance over the procedure noted above with reference to the form shown in Figures 4, 5 and 6, is that the cladding plate is of less width and length and the weld is different than that shown in Figures 1, 2 and 3. Otherwise the procedures and structures are the same.

Figure 6:
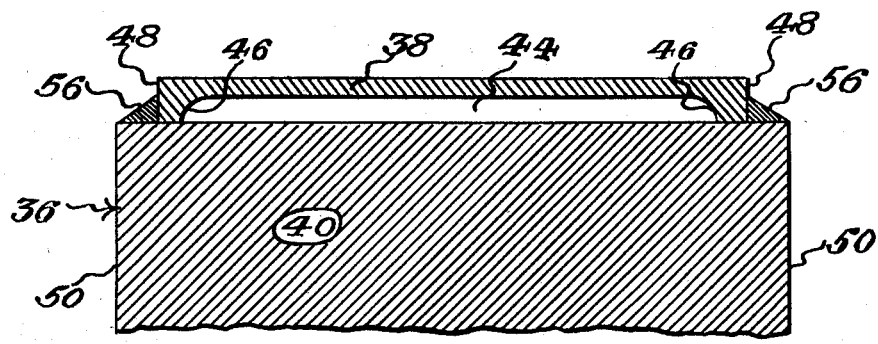
Figure 6 is a vertical section taken on line 6—6 of Figure 4.

In Figures 4 to 6 the plate as a whole is shown at 36. This consists of an cladding plate 38 and a base plate 40, the former having longitudinal and transverse grooves 42 and 44, each having curved ends 46 which terminate short of the side faces 48 of the cladding plate. The base plate has side faces 50 which extend beyond the side faces 48 of the cladding plate.

The cladding plate and base plate have confronting faces 52 and 54 respectively that are welded to each other by the heat or heats applied in the pit, and by rolling pressure, as described above.

One of the principal advantages of the present method and article is to provide ease of the rolling procedure with a minimum of "bowing," i.e., the "bowing" of the surface 26 away from the surface 28 of Figure 2, or the surface 52 away from the surface 54 of Figure 5, during the rolling procedure due to the different coefficients of expansion and contraction of the metals of which the cladding plate and base plate are composed, during the heating and rolling operations. This is provided by the discontinuous grooves 16 and 18 of Figure 1, or 42 and 44 of Figure 4.

The machined or otherwise formed grooves that terminate short of the cladding plate side edges will provide free movement of the cladding plate due to the thermal coefficient of expansion of the cladding plate for differences in the coefficient of expansion of the base or backing plate, thus minimizing thermal stresses which cause welds to fail, such as shown at 34 and 56 of the two forms of invention shown.

Even if the original cost of the cladding plate would be greater than cladding plates now in use, such cost would be more than offset by the improved shortness of welding time, a less amount of machining, and the increased yields with less weld failures when using the teachings of the instant process and article produced thereby.

It will be understood that the invention includes the method of making a composite steel plate wherein a backing plate is provided with a cladding plate of this invention on each side thereof. The above description and the drawings disclose several embodiments of the invention, and specific language has been employed in describing the several figures. It will, nevertheless, be understood that no limitations of the scope of the invention are thereby contemplated, and that various alterations and modifications may be made, such as would occur to one skilled in the art to which the invention relates.

I claim:

A method of making composite rectangular carbon steel plate comprising the steps of cutting a plurality of pairs of grooves, the grooves of each pair being parallel to each other, in the bottom face of a corrosion resistant cladding plate, the depth of the grooves being at least one-half the thickness of the cladding plate, extending each groove parallel to and in spaced relation with each side edge of said cladding plate, terminating the ends of each pair of grooves in curved surfaces and in planes perpendicular to said bottom face and short of the edges of said cladding plate and extending at least as far as the ends of another pair of grooves and at right angles thereto, assembling said cladding plate with its grooved surface in contacting face to face relation with a carbon steel backing plate having a different coefficient of expansion than said cladding plate, forming a welding groove in the edge of the assembly at the contacting faces of said cladding plate and backing plate, depositing weld metal in said welding groove to seal said cladding plate and said backing plate together, and heating the assembly to its welding temperature and then rolling the same to weld said surfaces together and also to the desired gauge.

References Cited in the file of this patent

UNITED STATES PATENTS

| | | |
|---|---|---|
| 1,754,721 | Linden | Apr. 15, 1930 |
| 2,498,275 | Johnson | Feb. 21, 1950 |
| 2,813,333 | Pompa | Nov. 19, 1957 |